United States Patent
Kato et al.

(10) Patent No.: US 8,684,508 B2
(45) Date of Patent: Apr. 1, 2014

(54) TREATMENT SOLUTION FOR INK-JET RECORDING, WATER-BASED INK SET FOR INK-JET RECORDING, INK-JET RECORDING METHOD AND INK-JET RECORDING APPARATUS

(75) Inventors: Ryuji Kato, Kiyosu (JP); Junichiro Sugimoto, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 203 days.

(21) Appl. No.: 13/228,792

(22) Filed: Sep. 9, 2011

(65) Prior Publication Data

US 2012/0081458 A1 Apr. 5, 2012

(30) Foreign Application Priority Data

Sep. 30, 2010 (JP) .................................. 2010-223245

(51) Int. Cl.
*B41J 2/01* (2006.01)
*B41J 2/21* (2006.01)

(52) U.S. Cl.
CPC .............. *B41J 2/2114* (2013.01); *B41J 2/2107* (2013.01); *B41J 2/01* (2013.01); *B41J 2/21* (2013.01)
USPC ................................ 347/96; 347/95; 347/100

(58) Field of Classification Search
CPC ................ B41J 2/01; B41J 2/21; B41J 2/107; B41J 2/2114
USPC ................ 347/21, 28, 95–100; 523/160, 161; 106/31.13, 31.6
See application file for complete search history.

(56) References Cited

U.S. PATENT DOCUMENTS

| | | | |
|---|---|---|---|
| 5,609,671 A | 3/1997 | Nagasawa | |
| 5,837,045 A | 11/1998 | Johnson et al. | |
| 2004/0070655 A1* | 4/2004 | Aoi et al. | 347/100 |
| 2005/0155516 A1* | 7/2005 | Hermansky | 106/31.25 |
| 2006/0201380 A1 | 9/2006 | Kowalski et al. | |
| 2007/0100023 A1 | 5/2007 | Burns et al. | |
| 2007/0100024 A1 | 5/2007 | Gu et al. | |
| 2007/0188571 A1* | 8/2007 | Tokita et al. | 347/100 |
| 2008/0241398 A1 | 10/2008 | Kato et al. | |
| 2012/0081459 A1* | 4/2012 | Sugimoto et al. | 347/21 |

(Continued)

FOREIGN PATENT DOCUMENTS

| | | |
|---|---|---|
| JP | 64-069381 | 3/1989 |
| JP | 08-003498 | 1/1996 |

(Continued)

*Primary Examiner* — Matthew Luu
*Assistant Examiner* — Rut Patel
(74) *Attorney, Agent, or Firm* — Banner & Witcoff, Ltd.

(57) ABSTRACT

There is provided a treatment solution used for ink-jet recording, including: quaternary alkylammonium hydroxide represented by general formula (1); an acid including at least one of dicarboxylic acid and tricarboxylic acid; and water; wherein the quaternary alkylammonium hydroxide is neutralized, to be a quaternary alkylammonium salt, by the at least one of the dicarboxylic acid and the tricarboxylic acid to have a degree of neutralization which is not less than 50% and not more than 110%;

(1)

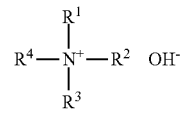

wherein each of $R_1$, $R_2$, $R_3$ and $R_4$ is an alkyl group having 1 to 4 carbon atoms; the alkyl group is a substituted alkyl group or an unsubstituted alkyl group, and is a straight chain alkyl group or a branched chain alkyl group; and the $R_1$ to $R_4$ are same with or different from one another.

13 Claims, 3 Drawing Sheets

(56) References Cited

FOREIGN PATENT DOCUMENTS

| | | |
|---|---|---|
| JP | 11-314449 | 11/1999 |
| JP | 2000-513396 | 10/2000 |
| JP | 2008-093883 | 4/2008 |
| JP | 2008-524400 | 7/2008 |
| JP | 2008-246821 | 10/2008 |
| JP | 2009-515007 | 4/2009 |

* cited by examiner

TREATMENT SOLUTION FOR INK-JET RECORDING, WATER-BASED INK SET FOR INK-JET RECORDING, INK-JET RECORDING METHOD AND INK-JET RECORDING APPARATUS

CROSS REFERENCE TO RELATED APPLICATION

The present application claims priority from Japanese Patent Application No. 2010-223245 filed on Sep. 30, 2010 the disclosure of which is incorporated herein by reference in its entirety.

BACKGROUND OF THE INVENTION

1. Field of the Invention

The present invention relates to a treatment solution for ink-jet recording, a water-based ink set for ink-jet recording, an ink-jet recording method and an ink-jet recording apparatus.

2. Description of the Related Art

In some cases, ink-jet recording is performed by using a treatment solution in which polyallylamine (PAA) is blended, for the purpose of improving optical density (OD value) of an image recorded with a water-based ink using a pigment. The PAA contained in the treatment solution is capable of causing the pigment in the water-based ink to aggregate on a recording medium, consequently making it possible to improve the optical density (OD value) of the recorded image.

However, the treatment solution described above has a problem of increased viscosity due to the PAA. Further, in a case that the PAA is blended as hydrochloride, there is a fear that a metal member (metallic member) making contact with the treatment solution in an ink-jet recording apparatus might corrode.

In view of the above situation, an object of the present invention is to provide a treatment solution for ink-jet recording capable of improving the optical density (OD value) of the recorded image without having increased viscosity and of lowering or preventing corrosion of a metal member making contact with the treatment solution in an ink-jet recording apparatus.

SUMMARY OF THE INVENTION

According to a first aspect of the present teaching, there is provided a treatment solution used for ink-jet recording, including:

quaternary alkylammonium hydroxide represented by general formula (1);

an acid including at least one of dicarboxylic acid and tricarboxylic acid; and water;

wherein the quaternary alkylammonium hydroxide is neutralized, to be a quaternary alkylammonium salt, by the at least one of the dicarboxylic acid and the tricarboxylic acid to have a degree of neutralization which is not less than 50% and not more than 110%;

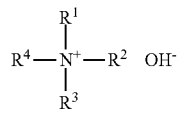

wherein each of $R_1$, $R_2$, $R_3$ and $R_4$ is an alkyl group having 1 to 4 carbon atoms;

the alkyl group is a substituted alkyl group or an unsubstituted alkyl group, and is a straight chain alkyl group or a branched chain alkyl group; and the $R_1$ to $R_4$ are same with or different from one another.

According to a second aspect of the present teaching, there is provided a water-based ink set for ink-jet recording, including: a water-based ink for ink-jet recording containing a pigment, water and a water-soluble organic solvent; and the treatment solution of the first aspect.

According to a third aspect of the present teaching, there is provided an ink-jet recording method for performing recording on a recording medium, the method including: applying, to the recording medium, the treatment solution of the water-based ink set for ink-jet recording of the second aspect; and discharging, to the recording medium, the water-based ink of the water-based ink set for ink-jet recording.

According to a fourth aspect of the present teaching, there is provided an ink-jet recording apparatus including: an ink-set accommodating section which accommodates the water-based ink set for ink-jet recording of the second aspect therein; a treatment solution applying mechanism which applies, to a recording medium, the treatment solution of the water-based ink set for ink-jet recording; and an ink discharge mechanism which discharges, to the recording medium, the water-based ink of the water-based ink set.

DESCRIPTION OF THE PREFERRED EMBODIMENTS

Figure 1:
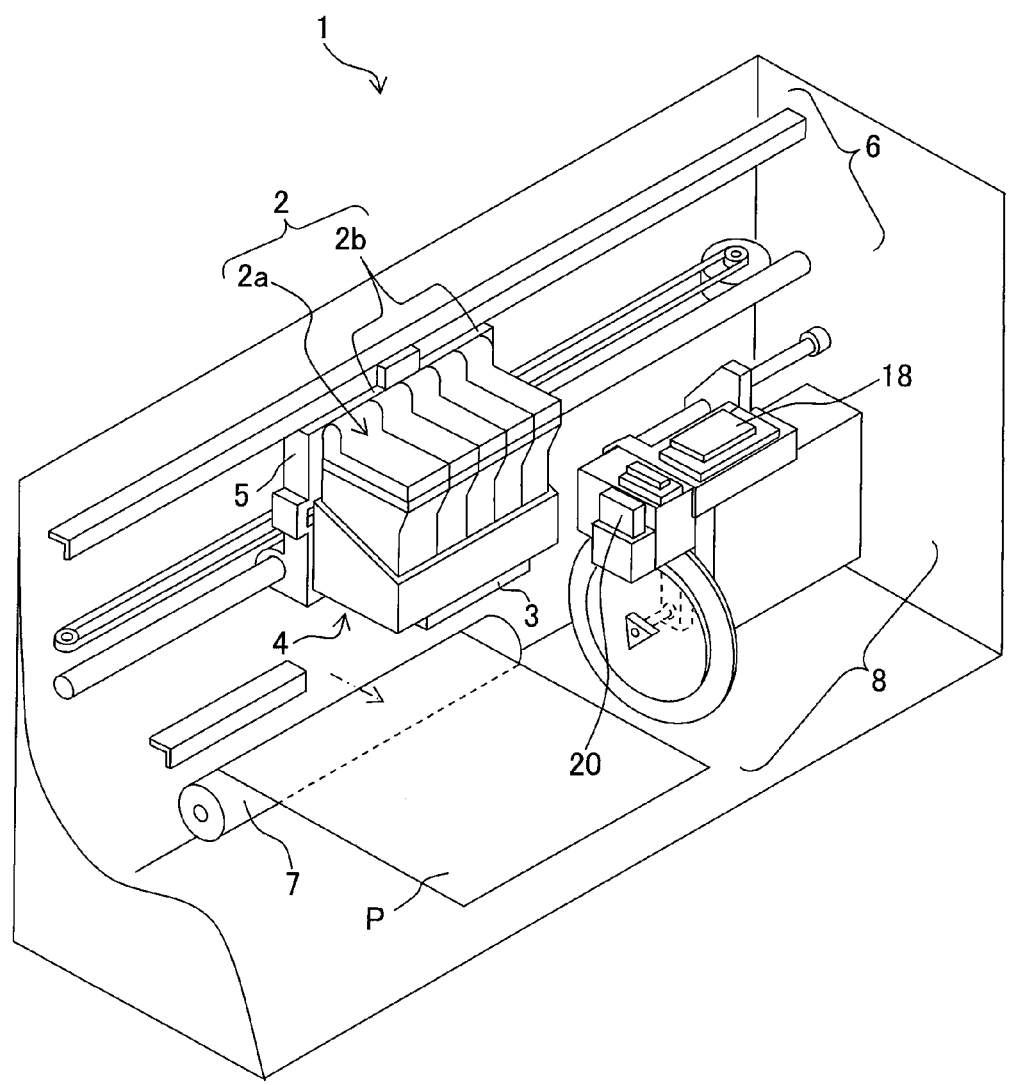
FIG. 1 is a schematic perspective view of construction of an example of an ink-jet recording apparatus (adopting a serial-type ink-jet head) of the present teaching.

As described above, the treatment solution of the present teaching is a treatment solution used for ink-jet recording and including quaternary alkylammonium salt generated as a result of neutralizing quaternary alkylammonium hydroxide, which is represented by the following general formula (1), with an acid including at least one of dicarboxylic acid and tricarboxylic acid; and water. The treatment solution of the present teaching may contain a component other than the quaternary alkylammonium salt and the water. Quaternary alkylammonium cations are generated from the quaternary alkylammonium salt. When the treatment solution and the water-based ink are brought into contact with each other on a recording medium, the quaternary alkylammonium cations have a function of, for example, causing a pigment which is negatively charged in the water-based ink to aggregate. With this, it is possible to improve the optical density (OD value) of a recorded image recorded on the recording medium.

Examples of the dicarboxylic acid include, for example, malic acid, itaconic acid, etc. Examples of the tricarboxylic acid include, for example, citric acid, etc. In a case that the acid is the dicarboxylic acid, ions of the dicarboxylic acid become counter ions of two ions of the quaternary alkylammonium; in a case that the acid is the tricarboxylic acid, ions of the tricarboxylic acid become counter ions of three ions of the quaternary alkylammonium.

In the general formula (1), each of the $R_1$ to $R_4$ is an alkyl group having 1 to 4 carbon atom or atoms (having a number of carbon atoms of 1 to 4). By using the quaternary alkylammonium salt having a low molecular weight in which each of the $R_1$ to $R_4$ is an alkyl group having 1 to 4 carbon atoms, the treatment solution does not become viscous (the viscosity of the treatment solution is not increased). Therefore, in a case that the treatment solution is discharged (jetted) by an ink-jet head, the discharge property of the treatment solution is also satisfactory. The alkyl group may be a straight chain group or a branched chain group; and examples of the alkyl group include methyl group, ethyl group, n-propyl group, isopropyl group, n-butyl group, sec-butyl group, isobutyl group and tert-butyl group. The alkyl group may have a substituent group such as halogen atom. In the general formula (1), the $R_1$ to $R_4$ may be same with or different from one another.

In the treatment solution of the present teaching, the degree of neutralization (neutralization degree) of the quaternary alkylammonium hydroxide is not less than 50% to not more than 110%. When the neutralization degree is within this range, the quaternary alkylammonium cations are generated from the quaternary alkylammonium salt resulting from the neutralization of quaternary alkylammonium hydroxide, thereby improving the optical density (OD value) of the recorded image. When the neutralization degree is not more than 50%, the optical density of the recorded image is not sufficiently improved due to fewer generation of the quaternary alkylammonium cations. When the neutralization degree is more than 110%, the pH of the treatment solution becomes to be less than 6 and, thus there might be a problem of corrosion of a metal member. Further, by neutralizing the quaternary alkylammonium hydroxide by at least one of the dicarboxylic acid and the tricarboxylic acid to have the neutralization degree of not less than 50% to not more than 110%, the pH of the treatment solution becomes to be not less than 6, and thus makes it possible to lower or prevent corrosion of a metal member making contact with the treatment liquid in an ink-jet recording apparatus. The neutralization degree is preferably not less than 70% to not more than 110%, and is more preferably not less than 90% to not more than 110%. Note that the neutralization degree can be calculated by the following expression (1). In a case that any one of the dicarboxylic acid and the tricarboxylic acid is used singly, the neutralization degree is a neutralization degree of the singly-used acid; in a case that both of the dicarboxylic acid and the tricarboxylic acid are used together, the neutralization degree is a sum of neutralization degrees of the dicarboxylic acid and the tricarboxylic acid which are used together.

$$\text{Neutralization degree (\%)} = \{(A \times B)/M\} \times (C/D) \times 100 \quad (1)$$

A: blending amount of acid (% by weight)
B: valence of acid
M: molecular weight of acid
C: molecular weight of quaternary alkylammonium hydroxide
D: blending amount of the quaternary alkylammonium hydroxide (% by weight)

On the other hand, when an acid other than the dicarboxylic acid and the tricarboxylic acid, for example, a monocarboxylic acid (for example, acetic acid, etc.) or nitric acid, etc. that is an acid stronger than the dicarboxylic acid and the tricarboxylic acid is used to make the neutralization degree be not more than 50% to not less than 110%, then there is a fear that the pH of the treatment solution might incline to acidic that is less than 6, which in turn causes a problem of the corrosion of a metal member and/or a problem regarding handling property of the treatment solution. Further, in the case of using the strong acid, even if the initial pH of the treatment solution can be adjusted to be not less than 6, there is a fear that the pH of the treatment solution in which the strong acid is used might incline to acidic during a long period of storage. By using at least one of the dicarboxylic acid and the tricarboxylic acid, which are relatively weak acid, in the treatment solution of the present teaching, it is possible to satisfy both of an optimal neutralization degree and an optimal pH at the same time. As a result, the treatment solution of the present teaching is capable of suppressing the corrosion of the metal member contacting with the treatment solution and of improving the optical density (OD value) of the recorded medium.

It is allowable to prepare the quaternary alkylammonium salt in-house or to use a commercially available product of the quaternary alkylammonium salt.

The blending amount (active-ingredient conversion rate) of the quaternary alkylammonium salt is not particularly limited. The blending amount (active-ingredient conversion rate) is, for example, 0.1% by weight to 15% by weight, is preferably 0.5% by weight to 10% by weight, and is more preferably 1% by weight to 7% by weight. Note that the term "active-ingredient conversion rate" means, for example, in a case that an aqueous solution of the quaternary alkylammonium salt is used, an amount of the quaternary alkylammonium salt itself, excluding the water.

The water which is used in the treatment solution is preferably ion-exchanged water or pure water (purified water). The blending amount of water with respect to the total amount (entire amount) of the treatment solution is, for example, the balance of the treatment solution, excluding the other component(s).

The treatment solution may further include a water-soluble organic solvent. As the water-soluble organic solvent, it is allowable to use publicly known products. The water-soluble organic solvent include, for example, polyvalent (polyhydric) alcohol, polyvalent alcohol derivative, alcohol, amide, ketone, ketoalcohol (ketone alcohol), ether, nitrogen-containing solvent, sulfur-containing solvent, propylene carbonate, ethylene carbonate, 1,3-dimethyl-2-imidazolidinone, etc. The polyvalent alcohol includes, for example, glycerol, ethylene glycol, propylene glycol, butylene glycol, hexylene glycol, diethylene glycol, triethylene glycol, polyethylene glycol, dipropylene glycol, tripropylene glycol, polypropylene glycol, trimethylolpropane, 1,5-pentanediol, 1,2,6-hexanetriol, etc. The polyvalent alcohol derivative includes, for example, ethylene glycol methyl ether, ethylene glycol ethyl ether, ethylene glycol-n-propyl ether, ethylene glycol-n-butyl ether, diethylene glycol methyl ether, diethylene glycol ethyl ether, diethylene glycol-n-propyl ether, diethylene glycol-n-butyl ether, diethylene glycol-n-hexyl ether, triethylene glycol methyl ether, triethylene glycol ethyl ether, triethylene glycol-n-propyl ether, triethylene glycol-n-butyl ether, propylene glycol methyl ether, propylene glycol ethyl ether, propylene glycol-n-propyl ether, propylene glycol-n-butyl ether, dipropylene glycol methyl ether, dipropylene glycol ethyl ether, dipropylene glycol-n-propyl ether, dipropylene glycol-n-butyl ether, tripropylene glycol methyl ether, tripropylene glycol ethyl ether, tripropylene glycol-n-propyl ether, and tripropylene glycol-n-butyl ether, etc. The alcohol includes, for example, methyl alcohol, ethyl alcohol, n-propyl alcohol, isopropyl alcohol, n-butyl alcohol, sec-butyl alcohol, isobutyl alcohol, tert-butyl alcohol, benzyl alcohol, etc. The amide includes, for example, dimethylformamide, dimethylacetamide, etc. The ketone includes, for example, acetone, etc. The keton alcohol (ketoalcohol) includes, for example, diacetone alcohol, etc. The ether includes, for example, tetrahydrofuran, dioxane, etc. The nitrogen-containing solvent includes, for example, pyrrolidone, 2-pyrrolidone, N-methyl-2-pyrrolidone, cyclohexyl pyrrolidone, triethanolamine, etc. The sulfur-containing solvent includes, for example, thiodiethanol, thiodiglycol, thiodiglycerol, sulfolane, dimethylsulfoxide, etc. The blending amount of the water-soluble organic solvent with respect to the entire amount of the treatment solution is not particularly limited. One kind of the water-soluble organic solvent may be used, or two or more kinds of the water-soluble organic solvent may be used together.

It is allowable that the treatment solution contains a colorant, or it is allowable that the treatment solution does not contain any colorant. In a case that the treatment solution contains a colorant, it is preferable that the colorant is contained in the treatment solution in an amount to an extent not affecting the recording of image and/or letter, etc.

The treatment solution may further contain a conventionally known additive, if necessary. The additive includes, for example, surfactants, pH-adjusting agents, viscosity-adjusting agents, surface tension-adjusting agents, antioxidants, and fungicides. The viscosity-adjusting agents include, for example, polyvinyl alcohol, cellulose, water-soluble resin, etc.

The treatment solution can be prepared, for example, by mixing the quaternary alkylammonium salt, water, and optionally other additive component(s) as necessary uniformly or homogeneously by any conventionally known method.

The treatment solution for ink-jet recording of the present teaching as described above is capable of improving the optical density (OD value) of a recorded image without having increased viscosity and is also capable of lowering or preventing corrosion of a metal member making contact with the treatment solution in an ink-jet recording apparatus.

A water-based ink for ink-jet recording (hereinafter referred to also simply as "water-based ink" or "ink"), which is usable together with the treatment solution of the present teaching, is not particularly limited. For example, it is allowable to use, as the water-based ink, a water-based ink which is to be explained next regarding a water-based ink set for ink-jet recording.

Next, an explanation will be given about a water-based ink set for ink-jet recording (hereinafter also referred to simply as "water-based ink set" or "ink set") of the present teaching. The water-based ink set of the present teaching is a water-based ink set including a water-based ink and a treatment solution, wherein the water-based ink is a water-based ink containing a pigment, water and a water-soluble organic solvent; and the treatment solution is the treatment solution of the present teaching. In the water-based ink set in which the pigment ink and the treatment solution of the present teaching are used in combination, the treatment solution does not have increased viscosity, and the water-based ink set is capable of improving the optical density (OD value) of recorded image, and is also capable of lowering or preventing the corrosion of a metal member making contact with the treatment solution in an ink-jet recording apparatus.

The pigment includes, for example, carbon black, an inorganic pigment, an organic pigment, etc. The carbon black includes, for example, furnace black, lamp black, acetylene black, channel black, etc. The inorganic pigment includes, for example, titanium oxide, inorganic pigments based on iron oxide, and inorganic pigments based on carbon black. The organic pigment includes, for example, azo-pigments such as azo lake, insoluble azo-pigment, condensed azo-pigment, chelate azo-pigment and the like; polycyclic pigments such as phthalocyanine pigment, perylene and perynon pigments, anthraquinone pigment, quinacridone pigment, dioxadine pigment, thioindigo pigment, isoindolinone pigment, quinophthalone pigment and the like; dye lake pigments such as basic dye type lake pigment, acid dye type lake pigment and the like; nitro pigments; nitroso pigments; aniline black daylight fluorescent pigment; and the like. Any other pigment is also usable provided that the pigment is dispersible in a water phase (aqueous phase). Specific example of the pigments as described above include, for example, C. I. Pigment Blacks 1, 6, and 7; C. I. Pigment Yellows 1, 2, 3, 12, 13, 14, 15, 16, 17, 55, 78, 150, 151, 154, 180, 185, and 194; C. I. Pigment Oranges 31 and 43; C. I. Pigment Reds 2, 3, 5, 6, 7, 12, 15, 16, 48, 48:1, 53:1, 57, 57:1, 112, 122, 123, 139, 144, 146, 149, 166, 168, 175, 176, 177, 178, 184, 185, 190, 202, 221, 222, 224, and 238; C. I. Pigment Violet 196; C. I. Pigment Blues 1, 2, 3, 15, 15:1, 15:2, 15:3, 15:4, 16, 22, and 60; C. I. Pigment Greens 7 and 36; and the like.

The pigment may be a self-dispersible pigment. The self-dispersible pigment is dispersible in water without using any dispersing agent, for example, owing to the fact that at least one of the hydrophilic functional group and the salt thereof including, for example, carbonyl group, hydroxyl group, carboxylic acid group, sulfonic acid group, phosphoric acid group, etc. is introduced into the surfaces of the pigment particles by the chemical bond directly or with any group intervening therebetween. It is possible to use self-dispersible pigments subjected to the surface treatment by any one of methods described, for example, in Japanese Patent Application Laid-open No. 8-3498 and Published Japanese Translation of PCT International Publication for Patent Application No. 2000-513396, Published Japanese Translation of PCT International Publication for Patent Application No. 2008-524400, Published Japanese Translation of PCT International Publication for Patent Application No. 2009-515007, etc. It is possible to use, as a material for the self-dispersible pigment, either one of the inorganic pigment and the organic pigment. Further, a pigment which is suitable for the above-described treatment, includes for example carbon black such as "MA8" and "MA100" produced by Mitsubishi Chemical Corporation and "Color Black FW200" produced by Degussa. As the self-dispersible pigment, it is possible to use a commercially available product. The commercially available product includes, for example, "CAB-O-JET (trade name) 200", "CAB-O-JET (trade name) 250C", "CAB-O-JET (trade name) 260M", "CAB-O-JET (trade name) 270Y", "CAB-O-JET (trade name) 300", "CAB-O-JET (trade name) 400", "CAB-O-JET (trade name) 450C", "CAB-O-JET (trade name) 465M" and "CAB-O-JET (trade name) 470Y" produced by Cabot Specialty Chemicals; "BONJET (trade name) BLACK CW-2" and "BONJET (trade name) BLACK CW-3" produced by Orient Chemical Industries, Ltd.; "LIO-JET (trade name) WD BLACK 002C" produced by Toyo Ink Mfg. Co., Ltd.; and the like.

The solid content blending amount of the pigment (pigment solid content) with respect to the entire amount of the water-based ink is not particularly limited, and may be appropriately determined based on, for example, desired optical density or color (hue, tint), etc. The pigment solid content is, for example, 0.1% by weight to 20% by weight, is preferably 1% by weight to 10% by weight, and is more preferably 2% by weight to 8% by weight.

The water-based ink may include a dye, etc. as a colorant, in addition to the above-described pigment.

The water used in the water-based ink is preferably ion-exchanged water or pure water (purified water). The blending amount of water (water ratio) with respect to the entire amount of the water-based ink is, for example, 10% by weight to 90% by weight, and is preferably 40% by weight to 80% by weight. The water ratio may be, for example, the balance of the ink, excluding the other components.

The water-soluble organic solvent used in the water-based ink includes, for example, a humectant which prevents the water-based ink from drying at an end of the nozzle in the ink-jet head and a penetrant which adjusts the drying speed of the water-based ink on a recording medium.

The humectant is not particularly limited, and includes, for example, lower alcohols such as methyl alcohol, ethyl alcohol, n-propyl alcohol, isopropyl alcohol, n-butyl alcohol, sec-butyl alcohol, and tert-butyl alcohol; amides such as dimethylformamide and dimethylacetamide; ketones such as acetone; ketoalcohols (ketone alcohols) such as diacetone alcohol; ethers such as tetrahydrofuran and dioxane; polyvalent (polyhydric) alcohols such as polyalkylene glycol, alkylene glycol, and glycerol; 2-pyrrolidone; N-methyl-2-pyrrolidone; and 1,3-dimethyl-2-imidazolidinone. The polyalkylene glycol is not limited, and includes, for example, polyethylene glycol and polypropylene glycol. The alkylene glycol is not limited, and includes, for example, ethylene glycol, propylene glycol, butylene glycol, diethylene glycol, triethylene glycol, dipropylene glycol, tripropylene glycol, thiodiglycol, and hexylene glycol. It is allowable that only one kind of the humectant as described above is used, or two or more kinds of the humectants are used in combination. Among the above-described humectants, it is preferable to use polyvalent alcohols such as alkylene glycol, glycerol, etc.

The blending amount of the humectant with respect to the entire amount of the water-based ink is, for example, 0% by weight to 95% by weight, is preferably 5% by weight to 80% by weight, and is more preferably 5% by weight to 50% by weight.

The penetrant is not limited, and includes, for example, glycol ether. The glycol ether is not limited, and includes, for example, ethylene glycol methyl ether, ethylene glycol ethyl ether, ethylene glycol-n-propyl ether, diethylene glycol methyl ether, diethylene glycol ethyl ether, diethylene glycol-n-propyl ether, diethylene glycol-n-butyl ether, diethylene glycol-n-hexyl ether, triethylene glycol methyl ether, triethylene glycol ethyl ether, triethylene glycol-n-propyl ether, triethylene glycol-n-butyl ether, propylene glycol methyl ether, propylene glycol ethyl ether, propylene glycol-n-propyl ether, propylene glycol-n-butyl ether, dipropylene glycol methyl ether, dipropylene glycol ethyl ether, dipropylene glycol-n-propyl ether, dipropylene glycol-n-butyl ether, tripropylene glycol methyl ether, tripropylene glycol ethyl ether, tripropylene glycol-n-propyl ether, and tripropylene glycol-n-butyl ether. It is allowable that only one kind of the penetrant as described above is used, or two or more kinds of the penetrants are used in combination.

The blending amount of the penetrant with respect to the entire amount of the water-based ink is, for example, 0% by weight to 20% by weight, is preferably 0.1% by weight to 15% by weight, and is more preferably 0.5% by weight to 10% by weight.

The water-based ink may further contain a conventionally known additive, if necessary. The additive includes, for example, surfactants, pH-adjusting agents, viscosity-adjusting agents, surface tension-adjusting agents, and fungicides. The viscosity-adjusting agents include, for example, polyvinyl alcohol, cellulose, water-soluble resin, etc.

The water-based ink can be prepared, for example, by mixing the pigment, water, a water-soluble organic solvent, and optionally other additive component(s) as necessary uniformly or homogeneously with any conventionally known method, and by removing undissolved matters by a filter or the like.

Next, in the present teaching, the water-based ink set for ink-jet recording can be provided also as an ink cartridge. The ink cartridge of the present teaching is, for example, an ink cartridge having an ink accommodating section and a treatment solution accommodating section, wherein the ink accommodating section accommodates the water-based ink of the present teaching and the treatment solution accommodating section accommodates the treatment solution of the present teaching. The ink cartridge of the present teaching may further include an accommodating section for another water-based ink other than the water-based ink of the present teaching.

The ink cartridge of the present teaching may be an ink cartridge assembly in which a water-based ink cartridge and a treatment solution cartridge, which are formed independently (distinctively) from each other, are assembled or collected; or may be an integrated-type ink cartridge of which an inner space is partitioned to define an ink accommodating section and a treatment solution accommodating section. It is allowable to use, for example, a conventionally known body for ink cartridge as the body of the ink cartridge of the present teaching.

Next, explanation will be given about an ink-jet recording method and an ink-jet recording apparatus of the present teaching.

The ink-jet recording method of the present teaching is an ink-jet recording method for performing recording on a recording medium by using a water-based ink set including a water-based ink for ink-jet recording and a treatment solution, the method including: applying the treatment solution to the recording medium; and performing recording on the recording medium by discharging (jetting) the water-based ink by the ink-jet system (in the ink-jet manner) to the recording medium, wherein the water-based ink set for ink-jet recording of the present teaching is used as the water-based ink set.

The ink-jet recording apparatus of the present teaching is an ink-jet recording apparatus including: an ink-set accommodating section which accommodates the water-based ink set for ink-jet recording of the present teaching therein; and a treatment solution applying mechanism which applies, to a recording medium, the treatment solution constructing the water-based ink set for ink-jet recording; and an ink discharge mechanism which discharges, to the recording medium, the water-based ink constructing the water-based ink set for ink-jet recording.

The ink-jet recording method of the present teaching can be carried out by, for example, using the ink-jet recording apparatus of the present teaching. The recording includes printing text (character, letter), printing image or picture, and printing, etc.

As shown in FIG. 1, an ink-jet recording apparatus 1 of the present teaching includes an ink cartridge assembly 2, an ink discharge mechanism (ink-jet head) 3, a head unit 4, a carriage 5, a driving unit 6, a platen roller 7 and a purge device 8 as main constitutive components or parts.

The ink cartridge assembly 2 includes a treatment solution cartridge 2a and four water-based ink cartridges 2b. The treatment solution cartridge 2a contains the treatment solution of the present teaching. The four water-based ink cartridges 2b contain four colors of water-based inks respectively, the four colors being yellow, magenta, cyan and black. At least one of the water-based inks of four colors contains a pigment as the colorant.

The ink-jet head 3 disposed on the head unit 4 performs recording on a recording medium (for example, recording paper or recording paper sheet) P. The ink cartridge assembly 2 and the head unit 4 are provided or arranged on the carriage 5. The driving unit 6 reciprocates the carriage 5 in a linear direction. As the driving unit 6, it is possible to use, for example, a conventionally known driving unit (see, for example, Japanese Patent Application laid-open No. 2008-246821). The platen roller 7 extends in the reciprocating direction of the carriage 5 and is arranged to face or be opposite to the ink-jet head 3.

The purge device 8 sucks or draws unsatisfactory ink (poor ink) which contains air bubbles, etc. accumulated or trapped in the ink-jet head 3. As the purge device 8, it is possible to use, for example, a conventionally known purge device (for example, see Japanese Patent Application laid-open No. 2008-246821).

A wiper member 20 is provided on the purge device 8, at a position on the side of the platen roller 7 such that the wiper member 20 is adjacent to the purge device 8. The wiper member 20 is formed to have a spatula shape, and wipes a nozzle-formed surface of the ink-jet head 3 accompanying with the movement (reciprocating movement) of the carriage 5. In FIG. 1, a cap 18 is provided to cover a plurality of nozzles of the ink-jet head 3 which is returned to a reset position upon completion of the recording, so as to prevent the treatment solution and the water-based ink from drying.

In the ink-jet recording apparatus 1 of the present teaching, the ink cartridge assembly 2 is provided, together with the head unit 4, on one carriage 5. However, the present teaching is not limited to this. In the ink-jet recording apparatus, each of the cartridges of the ink cartridge assembly 2 may be provided on a carriage which is different (separate) from the carriage on which the head unit 4 is provided. Alternatively, each of the cartridges of the ink cartridge assembly 2 may be arranged and fixed inside the ink-jet recording apparatus, rather than being provided on the carriage. In such aspects, for example, each of the cartridges of the ink cartridge assembly 2 and the head unit 4 which is provided on the carriage 5 are connected with a tube, etc., and the treatment solution and the water-based ink are supplied from the respective cartridges of the ink cartridge assembly 2 to the head unit 4 via the tubes.

Figure 2A:
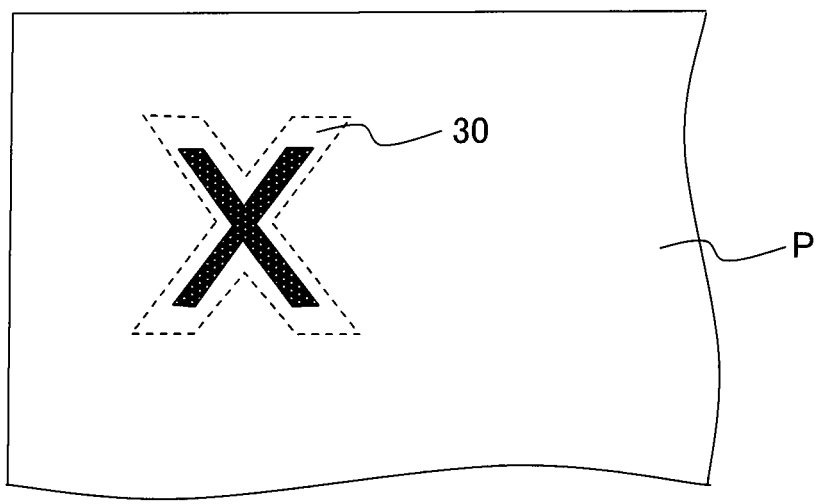
FIGS. 2A and 2B are images for illustrating examples of recording with an ink-jet recording method of the present teaching.
Figure 2B:
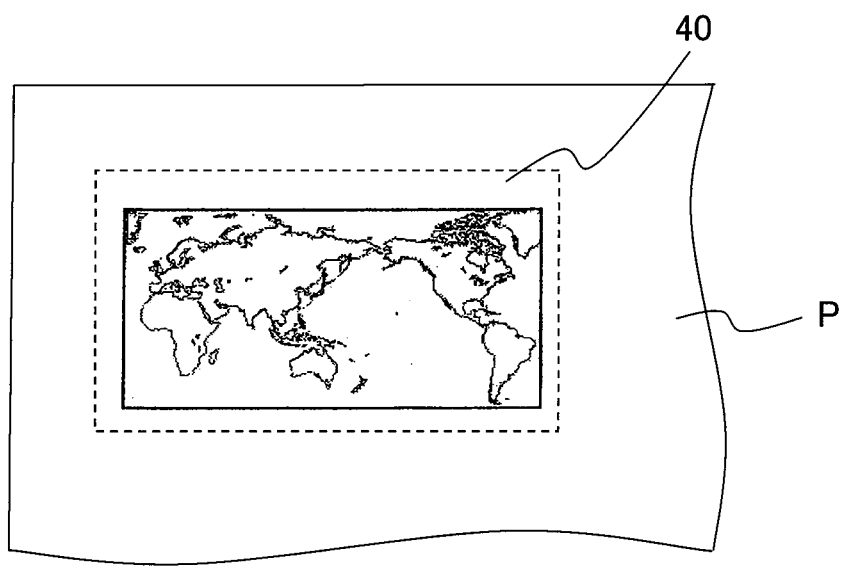

Ink-jet recording using the ink-jet recording apparatus 1 is performed, for example, in the following manner. Namely, at first, the treatment solution of the present teaching is applied (discharged) to the recording paper sheet P from the ink-jet head 3. The application of the treatment solution may be performed on an entire surface of a recording surface of the recording paper sheet P, or may be performed on a partial portion (a part) of the recording surface. In a case of applying the treatment solution to a partial portion of the recording surface of the recording paper sheet P (partial application), at least a recording portion, of the recording surface, on which the recording is performed (is to be performed) with the water-based ink, is an application portion. In the case of partial application, the size (dimension) of the application portion is preferably greater than that of the recording portion. For example, in a case that a letter "X" is to be recorded on the recording paper sheet P, it is preferable that the treatment solution is applied so that an application portion 30 is formed with a line width greater than the line width of the letter "X", as shown in FIG. 2A. Further, in a case that a pattern, an image, etc. is to be recorded on the recording paper sheet P, it is preferable that the treatment solution is applied so that an application portion 40 is formed to be greater than the pattern, etc., as shown in FIG. 2B.

Next, the water-based ink is discharged from the ink-jet head 3 to the application portion, of the recording paper sheet P, on which the treatment solution has been applied. The time (time interval) from the discharge of the treatment solution until the discharge of the water-based ink is not particularly limited. For example, it is allowable to perform the discharge of the water-based ink in a same scanning during which the discharge of the treatment solution is also performed. The treatment solution and the water-based ink are brought into contact with each other (make contact with each other) on the recording paper sheet P to thereby improve the optical density (OD value) of the recorded image.

As in this example, it is preferable that the water-based ink is discharged after the treatment solution has been discharged first on the recording paper sheet P. By doing so, it is possible for example to enhance the aggregation efficiency of the pigment in the water-based ink. The present teaching, however, is not limited to this. In the present teaching, it is allowable to apply the treatment solution to the recording medium after the water-based ink has been discharged first to the recording paper sheet P; or it is allowable to perform the application of the treatment solution to the recording paper sheet P and the discharge of the water-based ink to the recording paper sheet P may be performed at the same time.

In the ink-jet recording apparatus 1 of the present teaching, the ink discharge mechanism functions also as the treatment solution applying mechanism. The present teaching, however, is not limited to this. In the present teaching, the application of the treatment solution may be performed, for example, by a system or method such as stamp coating (application), brush coating, roller coating, etc. Since the treatment solution of the present teaching does not become viscous, the treatment solution can be applied or coated by any system of the ink discharge mechanism, the stamp coating, the brush coating, the roller coating, etc. Further, the treatment solution of the present teaching is also capable of lowering or preventing the corrosion of the metal member making contact with the treatment solution in the ink-jet recording apparatus.

The recording paper sheet P on which the recording has been performed in such a manner is discharged from the ink-jet recording apparatus 1. In FIG. 1, a paper feeding mechanism and a discharging mechanism for the recording paper sheet P are omitted.

In the apparatus shown in FIG. 1, an ink-jet head of serial type (serial type ink-jet head) is adopted. However, the present teaching is not limited to this. The ink-jet recording apparatus may be an apparatus adopting an ink-jet head of line type (line type ink-jet head).

Figure 3:
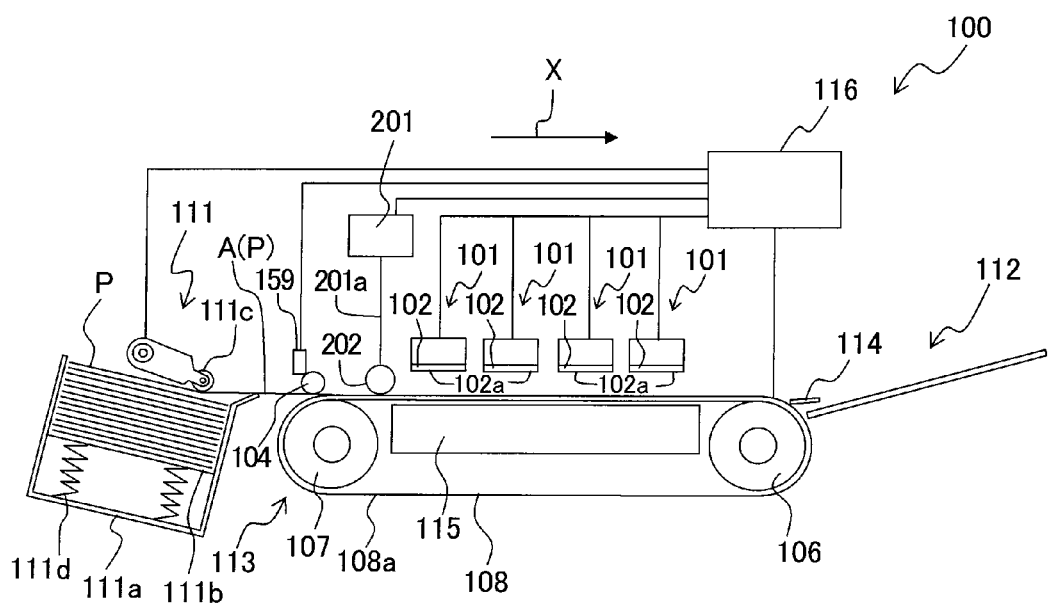
FIG. 3 is a schematic cross-sectional view of construction of an example of an ink-jet recording apparatus (adopting a line-type ink-jet head) of the present teaching.

Next, an explanation will be given about a line type ink-jet recording apparatus as another example of the ink-jet recording apparatus of the present teaching, as shown in FIG. 3. The line type ink-jet recording apparatus is such an ink-jet recording apparatus that the line type ink-jet head, which has a recording width of not less than the width of the recording medium, is used to thereby make it possible to collectively perform the recording in the widthwise direction of the recording medium in a state that the ink-jet head is fixed. On the other hand, in the case of the ink-jet recording apparatus of the serial type as described above, the recording is performed while moving the ink-jet head itself in the widthwise direction of the recording surface of the recording medium. The recording speed of the line type ink-jet recording apparatus is remarkably faster as compared with the serial type ink-jet recording apparatus.

An ink-jet recording apparatus 100 of this example includes, as main constitutive elements, a treatment solution cartridge 201, a treatment solution coating mechanism (coating roller) 202, four ink cartridges 101, four ink discharge mechanisms (line type ink-jet heads) 102, a paper feed section 111, a paper discharge section 112, a belt transport mechanism 113, and a controller 116 which controls the entire ink-jet recording apparatus 100. The paper feed section 111 is arranged on one side of the belt transport mechanism 113 (on the left side in FIG. 3). The paper discharge section 112 is arranged on the other side of the belt transport mechanism 113 (on the right side in FIG. 3).

A recording paper transport passage is formed in the ink-jet recording apparatus 100, along which the recording medium (for example, recording paper or recording paper sheet) P is transported from the paper feed section 111 to the paper discharge section 112 via the belt transport mechanism 113. An arrow X indicates a recording paper transport direction X in which the recording paper sheet P is transported. The paper feed section 111 includes a paper stocker 111a and a pick-up roller 111c. The paper stocker 111a stocks or accommodates the recording paper sheets P therein in a state that the paper sheets P are stacked; and the paper stocker 111a has an opening formed in the upper surface thereof. The paper stocker 111a is arranged in a state that the paper stocker 111a is inclined toward the downstream side in the paper transport direction X (toward the right side in FIG. 3, hereinafter referred to the "downstream side"). A support plate 111b is arranged inside the paper stocker 111a. The support plate 111b is urged, by a spring 111d, from the bottom surface of the paper stocker 111a toward the opening formed in the upper surface of the paper stocker 111a. The recording paper sheets are stacked on the support plate 111b. The pick-up roller 111c is driven by a paper-placement motor (not illustrated in the drawing) to pick up (take out) the recording paper sheets P stacked in the paper stocker 111a, one by one from thereabove, and to feed the recording paper sheets P thus picked up one by one toward the downstream side. A paper detection sensor 159 is arranged immediately downstream of the paper feed section 111. The paper detection sensor 159 detects whether or not a recording paper sheet P, which is fed from the paper feed section 111, arrives at a recording waiting position A located immediately upstream (left side in FIG. 3) of the belt transport mechanism 113 in the recording paper transport direction X. The fed recording paper sheet P passes through the recording waiting position A and is transported to the belt transport mechanism 113.

The belt transport mechanism 113 includes two belt rollers 106, 107; a transport belt 108; a platen 115; and a transport motor (not illustrated). The transport belt 108 is an endless belt wound around the two belt rollers 106 and 107 so that the transport belt 108 runs between the rollers 106 and 107. An outer surface of the transport belt 108 is an outer circumference surface 108a. The platen 115 is arranged in an area surrounded by the transport belt 108 (area defined inside the endless transport belt 108) at a position at which the platen 115 is opposite to or face the coating roller 202 and the four line type ink-jet heads 102. The platen 115 supports the transport belt 108 in the area facing the coating roller 202 and the four line type ink-jet heads 102 so that the transport belt 108 does not sag or bend downwardly. A nip roller 104 is arranged at a position facing the belt roller 107. The nip roller 4 presses the recording paper sheet P against the outer circumferential surface 108a of the transport belt 108 when the recording paper sheet P, which is transported to the belt transport mechanism 113, is placed on the outer circumferential surface 108a. When the transport motor rotates the belt roller 106, the transport belt 108 is driven (rotated) to thereby cause the transport belt 108 to transport the recording paper sheet P, pressed onto the outer circumference surface 108a, toward the paper discharge section 112 while pressingly holding the recording paper sheet P on the outer circumference surface 108a. An exfoliating mechanism 114 is provided immediately downstream of the transport belt 108. The exfoliating mechanism 114 is constructed such that the recording paper sheet P, which is pressingly stuck to the outer circumferential surface 108a, is exfoliated from the outer circumferential surface 108a, and that the recording paper sheet P is fed to the paper discharge section 112.

An ink set in the ink-jet recording apparatus 100 is constructed of four water-based ink cartridges 101 and a treatment solution cartridge 102 which are formed independently and separately from one another. A supply tube 201a through which the treatment solution is supplied to the coating roller 202 extends from the treatment solution cartridge 102. Each of the four ink cartridges 101 has a line type ink-jet head 102 on the lower end thereof The four ink cartridges 101 contain or store four color water-based inks of yellow, magenta, cyan and black respectively, and at least one of the four water-based color inks contains a pigment as the colorant.

The four ink cartridges 101 and the coating roller 202 are aligned in the paper transport direction X and are fixed to face the belt transport mechanism 113. The coating roller 202 is arranged upstream of the four ink cartridges 101 in the paper transport direction X.

Ink-jet recording using the ink-jet recording apparatus 100 is performed, for example, as follows. At first, when a recording paper sheet P transported by the transport belt 108 is passing just below or under the coating roller 202, the coating roller 202 makes contacts with the recording paper sheet P and is rotated. Further, the coating roller 202 coats, while rotating, the treatment solution supplied from the treatment solution cartridge 201 to the upper surface of the recording paper sheet P. Next, the recording paper sheet P, on which the treatment solution has been coated at an application portion thereof, passes just below the four line type ink-jet heads 102. When the recording paper sheet P is passing just below the four line type ink-jet heads 102, the water-based inks are discharged from the four line type ink-jet heads 102 respectively to the application portion, of the recording paper sheet P, to which the treatment solution has been applied. The treatment solution and the water-based inks are brought into contact with one another on the recording paper sheet P, and thus the optical density (OD value) of the recorded image is improved.

Note that each of the ink-jet recording apparatus 1 shown in FIG. 1 and the ink-jet recording apparatus 100 shown in FIG. 3 may include a metal member which contacts with the treatment solution. Since in the treatment solution of the present teaching, the quaternary alkylammonium hydroxide represented by the general formula (1) is neutralized by at least one of the dicarboxylic acid and the tricarboxylic acid, the metal member in each of the ink-jet recording apparatuses 1 and 100 is hardly corroded. Examples of the metal member may include, for example, a flow passage for the treatment solution inside the ink-jet head 3, or a flow passage inside the ink cartridge assembly 2 in the ink-jet recording apparatus 1 shown in FIG. 1, or the coating roller 202 in the ink-jet recording apparatus 100 shown in FIG. 3, etc. The material of the metal member may include, for example, a nickel-containing ally (nickel alloy) such as 42 alloy, invar, permalloy, etc.

EXAMPLES

Next, examples of the present teaching will be explained together with comparative examples. Note that the present teaching is not limited and is not restricted to the examples and the comparative examples which will be described below.
(Preparation of Treatment Solution)

Components each indicated in Composition of Treatment Solution (TABLES 2 to 4) were mixed uniformly or homogeneously, and thus treatment solutions 1 to 27 were obtained.
(Preparation of Water-Based Ink)

Components except for a water dispersion of self-dispersible carbon black (self-dispersible carbon black water dispersion), which were included in Composition of Water-based Ink (TABLE 1) as indicated below, were mixed uniformly or homogeneously; and thus an ink solvent was obtained. Subsequently, the self-dispersible carbon black water dispersion was added to the ink solvent, followed by being mixed uniformly. After that, the obtained mixture was filtrated through a cellulose acetate membrane filter (pore size 3.00 μm) produced by Toyo Roshi Kaisha, Ltd., and thus a water-based ink for ink-jet recording was obtained.

TABLE 1

| Composition of Water-based Ink | Blending amount (% by weight) |
|---|---|
| CAB-O-JET (trade name) 300 (*1) | 26.7 (4.0) |
| Glycerol | 20.0 |
| Diethylene glycol | 4.0 |
| Dipropylene glycol-n-propyl ether | 2.0 |
| Sodium polyoxyethylene lauryl ether sulfate (*2) | 1.0 |
| Water | balance |

*1: Water dispersion of self-dispersible carbon black, produced by Cabot, carbon black concentration = 15% by weight (parenthesized numeral indicates pigment solid content amount).
*2: Oxyethylene average polymerization degree = 12

Examples 1-11 and Comparative Examples 1-16

The treatment solutions 1-27 were each used in combination with the water-based ink for ink-jet recording to record an image; and the evaluation of the optical density (OD value) of the recorded image was performed in the following manner.
Evaluation of Optical Density (OD Value) of Recorded Image The treatment solutions 1-27 used in the examples and comparative examples were each spread uniformly on a plain recording paper (plain paper sheet; "My Paper" produced by Ricoh, Company, Ltd.) with a bar coater (Bar Coater, Rod No. 8 produced by Yasuda Seiki Seisakusho, Ltd.). Next, a digital multifunction machine DCP-330C provided with an ink-jet printer produced by Brother Industries, Ltd. was used to record a single-color black patch with the water-based ink for ink-jet recording on the recording plain paper sheets, on each of which one of the treatment solutions had been spread, at a resolution of 600 dpi×600 dpi, and evaluation samples were prepared. The optical density (OD value) of each of the evaluation samples was measured by using a spectrophotometric colorimetry meter Spectrolino (light source: $D_{50}$, field: 2°, filter: Status T) produced by Gretag Macbeth, and evaluations were made for the evaluation samples based on the following evaluation criterion. The evaluation result of the optical density (OD value) is an average value of those obtained by performing the measurement five times.

The composition, pH, neutralization degree of the treatment solution of each of Examples 1-11 and Comparative Examples 1-16 and the evaluation results therefor are shown in TABLES 2 to 4. The criterion for the pH of the treatment solution is as follows. G (passed): pH was not less than 6, and NG (rejected): pH was less than 6. In TABLE 2, the evaluation result of the optical density (OD value) of a recorded image which was obtained by using only the water-based ink for ink-jet recording, but without applying the treatment solution on the plain paper, is indicated as "Reference".

TABLE 2

| | | EXAMPLES | | | | | | |
|---|---|---|---|---|---|---|---|---|
| | | EX. 1 | EX. 2 | EX. 3 | EX. 4 | EX. 5 | EX. 6 | EX. 7 |
| Treatment Solution | | 1 | 2 | 3 | 4 | 5 | 6 | 7 |
| Acid | | malic acid | malic acid | malic acid | malic acid | itaconic acid | itaconic acid | itaconic acid |
| Composition of Treatment Solution (% by weight) | Quaternary alkylammonium hydroxide (*1) | 5.0 | 5.0 | 5.0 | 5.0 | 5.0 | 5.0 | 5.0 |
| | Quaternary alkylammonium hydroxide (*2) | — | — | — | — | — | — | — |
| | Quaternary alkylammonium hydroxide (*3) | — | — | — | — | — | — | — |
| | Dipropylene glycol-n-propyl ether | 1.0 | 1.0 | 1.0 | 1.0 | 1.0 | 1.0 | 1.0 |

TABLE 2-continued

|  |  |  |  |  |  |  |  |  |
|---|---|---|---|---|---|---|---|---|
|  | Diethylene glycol | 10.0 | 10.0 | 10.0 | 10.0 | 10.0 | 10.0 | 10.0 |
|  | Acid | 1.80 | 1.70 | 1.30 | 0.85 | 1.70 | 1.60 | 1.20 |
|  | Water | balance | balance | balance | balance | balance | balance | balance |
| Physical property | Degree of neutralization (%) | 109.1 | 103.0 | 78.8 | 51.5 | 106.2 | 99.9 | 75.0 |
|  | pH | 6.3 | 6.8 | 12.4 | 12.5 | 6.7 | 11.5 | 12.5 |
|  |  | G | G | G | G | G | G | G |
| Evaluation of optical density (OD value) of recorded image |  | 1.39 | 1.37 | 1.24 | 1.23 | 1.38 | 1.35 | 1.23 |

|  |  | EXAMPLES |  |  |  |  |
|---|---|---|---|---|---|---|
|  |  | EX. 8 | EX. 9 | EX. 10 | EX. 11 | Reference |
| Treatment Solution |  | 8 | 9 | 10 | 11 | none |
| Acid |  | itaconic acid | citric acid | malic acid | malic acid | — |
| Composition of Treatment Solution (% by weight) | Quaternary alkylammonium hydroxide (*1) | 5.0 | 5.0 | — | — | — |
|  | Quaternary alkylammonium hydroxide (*2) | — | — | 5.0 | — | — |
|  | Quaternary alkylammonium hydroxide (*3) | — | — | — | 5.0 | — |
|  | Dipropylene glycol-n-propyl ether | 1.0 | 1.0 | 1.0 | 1.0 | — |
|  | Diethylene glycol | 10.0 | 10.0 | 10.0 | 10.0 | — |
|  | Acid | 0.80 | 1.60 | 3.50 | 1.30 | — |
|  | Water | balance | balance | balance | balance | — |
| Physical property | Degree of neutralization (%) | 50.0 | 101.5 | 95.3 | 100.5 | — |
|  | pH | 12.7 | 8.8 | 12.1 | 9.8 | — |
|  |  | G | G | G | G |  |
| Evaluation of optical density (OD value) of recorded image |  | 1.20 | 1.24 | 1.23 | 1.29 | 1.18 |

(*1): quaternary alkylammonium hydroxide (active ingredient amount) in which each of $R_1$ to $R_4$ is n-propyl group in the general formula (1)
(*2): quaternary alkylammonium hydroxide (active ingredient amount) in which each of $R_1$ to $R_4$ is methyl group in the general formula (1)
(*3): quaternary alkylammonium hydroxide (active ingredient amount) in which each of $R_1$ to $R_4$ is n-butyl group in the general formula (1)

TABLE 3

|  |  | COMPARATIVE EXAMPLES |  |  |  |  |  |  |
|---|---|---|---|---|---|---|---|---|
|  |  | COM. EX. 1 | COM. EX. 2 | COM. EX. 3 | COM. EX. 4 | COM. EX. 5 | COM. EX. 6 | COM. EX. 7 |
| Treatment Solution |  | 12 | 13 | 14 | 15 | 16 | 17 | 18 |
| Acid |  | not neutralized | malic acid | malic acid | malic acid | itaconic acid | itaconic acid | itaconic acid |
| Composition of Treatment Solution (% by weight) | Quaternary alkylammonium hydroxide (*1) | 5.0 | 5.0 | 5.0 | 5.0 | 5.0 | 5.0 | 5.0 |
|  | Dipropylene glycol-n-propyl ether | 1.0 | 1.0 | 1.0 | 1.0 | 1.0 | 1.0 | 1.0 |
|  | Diethylene glycol | 10.0 | 10.0 | 10.0 | 10.0 | 10.0 | 10.0 | 10.0 |
|  | Acid | — | 2.50 | 2.00 | 0.50 | 2.50 | 2.00 | 0.50 |
|  | Water | balance | balance | balance | balance | balance | balance | balance |
| Physical property | Degree of neutralization (%) | 0 | 151.5 | 121.2 | 30.3 | 156.2 | 124.9 | 31.2 |
|  | pH | 12.9 | 4.8 | 5.3 | 12.8 | 5.3 | 5.7 | 12.8 |
|  |  | G | NG | NG | G | NG | NG | G |
| Evaluation of optical density (OD value) of recorded image |  | 1.15 | 1.50 | 1.42 | 1.15 | 1.52 | 1.49 | 1.15 |

(*1): quaternary alkylammonium hydroxide (active ingredient amount) in which each of $R_1$ to $R_4$ is n-propyl group in the general formula (1)

TABLE 4

| | | COMPARATIVE EXAMPLES | | | | |
|---|---|---|---|---|---|---|
| | | COM. EX. 8 | COM. EX. 9 | COM. EX. 10 | COM. EX. 11 | COM. EX. 12 |
| Treatment Solution | | 19 | 20 | 21 | 22 | 23 |
| Acid | | acetic acid | acetic acid | acetic acid | acetic acid | acetic acid |
| Composition of Treatment Solution (% by weight) | Quaternary alkylammonium hydroxide (*1) | 5.0 | 5.0 | 5.0 | 5.0 | 5.0 |
| | Dipropylene glycol-n-propyl ether | 1.0 | 1.0 | 1.0 | 1.0 | 1.0 |
| | Diethylene glycol | 10.0 | 10.00 | 10.00 | 10.00 | 10.00 |
| | Acid | 5.00 | 2.50 | 1.70 | 0.50 | 0.25 |
| | Water | balance | balance | balance | balance | balance |
| Physical property | Degree of neutralization (%) | 338.3 | 169.2 | 117.1 | 33.8 | 16.9 |
| | pH | 4.3 | 5.0 | 5.5 | 12.6 | 12.9 |
| | | NG | NG | NG | G | G |
| Evaluation of optical density (OD value) of recorded image | | 1.48 | 1.48 | 1.41 | 1.15 | 1.16 |

| | | COMPARATIVE EXAMPLES | | | |
|---|---|---|---|---|---|
| | | COM. EX. 13 | COM. EX. 14 | COM. EX. 15 | COM. EX. 16 |
| Treatment Solution | | 24 | 25 | 26 | 27 |
| Acid | | nitric acid | nitric acid | nitric acid | nitric acid |
| Composition of Treatment Solution (% by weight) | Quaternary alkylammonium hydroxide (*1) | 5.0 | 5.0 | 5.0 | 5.0 |
| | Dipropylene glycol-n-propyl ether | 1.0 | 1.0 | 1.0 | 1.0 |
| | Diethylene glycol | 10.0 | 10.00 | 10.00 | 10.00 |
| | Acid | 3.60 | 2.40 | 1.65 | 0.25 |
| | Water | balance | balance | balance | balance |
| Physical property y | Degree of neutralization (%) | 232.0 | 154.7 | 106.3 | 16.1 |
| | pH | 0.6 | 0.8 | 1.9 | 12.9 |
| | | NG | NG | NG | G |
| Evaluation of optical density (OD value) of recorded image | | 1.55 | 1.55 | 1.51 | 1.13 |

(*1): quaternary alkylammonium hydroxide (active ingredient amount) in which each of $R_1$ to $R_4$ is n-propyl group in the general formula (1)

As shown in TABLE 2, in each of Examples 1-11, the optical density (OD value) of the recorded image was improved as compared with the Reference. Further, in Examples 1-11, the pH of the treatment solution was not less than 6. Accordingly, it is possible to lower or suppress the corrosion of metal member contacting with the treatment solution in the ink-jet recording apparatus.

On the other hand, as shown in TABLE 3, in each of Comparative Examples 1, 4 and 7 in which the neutralization degree was less than 50 although at least one of the dicarboxylic acid and the tricarboxylic acid was used to neutralize the quaternary alkylammonium hydroxide; and thus the optical density (OD value) of the recorded image was inferior to that of the Reference. In Comparative Examples 1, 4 and 7, the pH was not less than 6 that was "passed (G)", not causing the problem of corrosion of the metal member. However, the neutralization degree was low (less than 50%) in each of Comparative Examples 1, 4 and 7, and thus it is considered that the quaternary alkylammonium cations were not generated in a sufficient amount for improving the optical density (OD value) of the recorded image. It is appreciated from the comparison results between Examples 1-11 and Comparative Examples 1, 4 and 7 that even if the pH of the treatment solution was not less than 6, the optical density (OD value) of the recorded image did not improve in a case that the neutralization degree was a value other than "not less than 50%".

Further, in each of Comparative Examples 2, 3, 5 and 6, although at least one of the dicarboxylic acid and the tricarboxylic acid was used to neutralize the quaternary alkylammonium hydroxide, the pH of the treatment solution was less than 6 because the neutralization degree exceeded 110. Therefore, there is a fear that the treatment solutions of Comparative Examples 2, 3, 5 and 6 might cause corrosion of the metal member.

Furthermore, as shown in TABLE 4, in each of Comparative Examples 11, 12 and 16, the acetic acid or the nitric acid was used for neutralizing the quaternary alkylammonium hydroxide and the neutralization degree of the treatment solution was less than 50. Therefore, the optical density (OD value) of the recorded image was inferior to that of the Reference. In Comparative Examples 11, 12 and 16, the pH was not less than 6 that was "passed (G)", not causing the problem of corrosion of the metal member. However, the neutralization degree was low (less than 50%) in Comparative Examples 11, 12 and 16, and thus it is considered that the quaternary alkylammonium cations were not generated in a sufficient amount for improving the optical density (OD value) of the recorded image. Further, since the acid stronger than the dicarboxylic acid and tricarboxylic acid was used, there is a fear that in Comparative Examples 11, 12 and 16, the pH of the treatment solution might incline to acidic in a case that the treatment solution is stored for a long period of time.

Moreover, in each of Comparative Examples 8-10, 13 and 14, since the acetic acid or the nitric acid was used for neutralizing the quaternary alkylammonium hydroxide and the neutralization degree of the treatment solution exceeded 110 (%), the pH of the treatment solution was less than 6. Therefore, there is a fear that the treatment solutions of Comparative Examples 8-10, 13 and 14 might corrode the metal member.

Note that in Comparative Example 15 in which the nitric acid was used for neutralizing the quaternary alkylammonium hydroxide, the pH of the treatment solution was less than 6 even though the neutralization degree of the treatment solution was 106.3(%) that was not less than 50% and not more than 110%. From this result, it is appreciated that when a strong acid is used to neutralize the quaternary alkylammonium hydroxide, the pH of the treatment solution is lowered to an extent greater than that expected from the neutralization degree, and that there is an increased fear that corrosion might occur in a metal member contacting with the treatment solution in the ink-jet recording apparatus. Further, the treatment solution of each of Comparative Examples 8-12, in which the acetic acid was used to neutralize the quaternary alkylammonium hydroxide, had a problem of odor.

As described above, the treatment solution for ink-jet recording of the present teaching is capable of improving the optical density (OD value) of a recorded image without having increased viscosity, and is also capable of lowering or preventing corrosion of a metal member making contact with the treatment solution in the ink-jet recording apparatus. The usage of the treatment solution of the present teaching is not particularly limited; and the treatment solution is widely applicable to a variety of kinds of ink-jet recording.

What is claimed is:

1. A treatment solution used for ink-jet recording, comprising: quaternary alkylammonium hydroxide represented by general formula (1); an acid including at least one of dicarboxylic acid and tricarboxylic acid; and water;

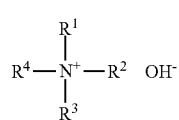

(1)

wherein each of $R_1$, $R_2$, $R_3$ and $R_4$ is an alkyl group having 1 to 4 carbon atoms;

the alkyl group is a substituted alkyl group or an unsubstituted alkyl group, and is a straight chain alkyl group or a branched chain alkyl group; and the $R_1$ to $R_4$ are same with or different from one another, wherein the neutralization degree of the quaternary alkylammonium hydroxide which is calculated by the following formula (1) is not less than 50% to not more than 110%;

Neutralization degree (%)=$\{(A \times B)/M\} \times (C/D) \times 100$ (1)

Wherein in expression (1),
A: blending amount of acid (% by weight)
B: valence of acid
M: molecular weight of acid
C: molecular weight of quaternary alkylammonium hydroxide
D: blending amount of the quaternary alkylammonium hydroxide (% by weight).

2. The treatment solution according to claim 1, wherein the acid is at least one acid selected from a group consisting of a malic acid, an itaconic acid and a citric acid.

3. The treatment solution according to claim 1, wherein a source of positive ions consists essentially of at least one quaternary alkylammonium hydroxide represented by general formula (1).

4. The treatment solution according to claim 1, wherein the acid is a malic acid, and the neutralization degree of the quaternary alkylammonium hydroxide is not less than 103% and not more than 110%.

5. The treatment solution according to claim 1, wherein the acid is a itaconic acid, and the neutralization degree of the quaternary alkylammonium hydroxide is not less than 99.9% and not more than 106.2%.

6. A water-based ink set for ink jet recording, comprising:
a water-based ink for ink jet recording containing a pigment, water and a water-soluble organic solvent; and
the treatment solution as defined in claim 1.

7. An ink jet recording method for performing recording on a recording medium, the method comprising:
applying, to the recording medium, the treatment solution of the water-based ink set for ink jet recording as defined in claim 6; and
discharging, to the recording medium, the water-based ink of the water-based ink set for ink-jet recording.

8. The ink jet recording method according to claim 7, wherein the water-based ink is discharged to the recording medium after the treatment solution has been applied to the recording medium.

9. An ink jet recording apparatus comprising:
an ink-set accommodating section which accommodates the water-based ink set for ink-jet recording as defined in claim 6 therein; and
a treatment solution applying mechanism which applies, to a recording medium, the treatment solution of the water-based ink set for ink-jet recording; and
an ink discharge mechanism which discharges, to the recording medium, the water-based ink of the water-based ink set for ink jet recording.

10. The ink jet recording apparatus according to claim 9, wherein the treatment solution applying mechanism is a treatment solution discharge mechanism which discharges the treatment solution to the recording medium or a treatment solution coating mechanism which coats the treatment solution onto the recording medium.

11. The ink jet recording apparatus according to claim 9, further comprising a metal member which makes contact with the treatment solution.

12. The ink jet recording apparatus according to claim 11, wherein the treatment solution applying mechanism includes the metal member which makes contact with the treatment solution.

13. The ink jet recording apparatus according to claim 11, wherein the metal member includes a nickel alloy.

* * * * *